United States Patent
Humfeld et al.

(10) Patent No.: US 10,942,150 B2
(45) Date of Patent: Mar. 9, 2021

(54) ADHESIVE ADDITIVE WITH ENHANCED STIFFNESS CHANGE AND NON-DESTRUCTIVE INSPECTION METHOD

(71) Applicant: The Boeing Company, Chicago, IL (US)

(72) Inventors: Keith D. Humfeld, Federal Way, WA (US); Eileen O. Kutscha, Seattle, WA (US); Morteza Safai, Newcastle, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/862,887

(22) Filed: Apr. 30, 2020

(65) Prior Publication Data

US 2020/0271623 A1   Aug. 27, 2020

Related U.S. Application Data

(62) Division of application No. 15/794,476, filed on Oct. 26, 2017, now Pat. No. 10,677,759.

(51) Int. Cl.
*G01N 29/04* (2006.01)
*C09J 11/04* (2006.01)
(Continued)

(52) U.S. Cl.
CPC .......... *G01N 29/041* (2013.01); *B32B 7/12* (2013.01); *B32B 27/08* (2013.01); *B64F 5/60* (2017.01);
(Continued)

(58) Field of Classification Search
CPC . C09J 161/06; C09J 11/04; B32B 7/02; B32B 7/12; B32B 5/26; B32B 27/08;
(Continued)

(56) References Cited

U.S. PATENT DOCUMENTS 4,184,373 A * 1/1980 Evans ............... G01N 29/11
73/588
9,604,403 B1 * 3/2017 Wilenski ............. B29C 66/341
(Continued)

FOREIGN PATENT DOCUMENTS

| GB | 1492853 A | 11/1977 |
| JP | 2014141766 A | 8/2014 |

OTHER PUBLICATIONS

Demczyk, B. et al., "Direct Mechanical Measurement of the Tensile Strength and Elastic Modulus of Multiwalled Carbon Nanotubes", Materials Science and Engineering: A, vol. 334 No. 1-2, Sep. 1, 2002, pp. 173-178, Elsevier.

*Primary Examiner* — Jacques M Saint Surin
(74) *Attorney, Agent, or Firm* — Coats & Bennett, PLLC

(57) ABSTRACT

A composite material joined with a curable phenolic resin adhesive, with the phenolic resin adhesive comprising a stiffening agent precursor, and with the stiffening agent precursor selected to react with reaction by-products of the phenolic resin adhesive during curing to produce a reaction product stiffening agent in a cured bonding layer that is detectable by ultrasound, resins comprising the stiffening agent precursor, bonding layers comprising the reaction product stiffening agent, and methods for making the composite material joints and inspecting the composite material joints are disclosed.

20 Claims, 5 Drawing Sheets

(51) Int. Cl.
*C09J 161/06* (2006.01)
*B32B 7/12* (2006.01)
*B32B 27/08* (2006.01)
*B64F 5/60* (2017.01)
*G01N 29/11* (2006.01)
*G01N 29/07* (2006.01)
*C08K 3/26* (2006.01)

(52) U.S. Cl.
CPC ............ *C09J 11/04* (2013.01); *C09J 161/06* (2013.01); *G01N 29/07* (2013.01); *G01N 29/11* (2013.01); *B32B 2605/18* (2013.01); *C08K 3/26* (2013.01); *C08K 2003/262* (2013.01); *C08K 2003/265* (2013.01); *C08K 2003/267* (2013.01); *G01N 2291/011* (2013.01); *G01N 2291/015* (2013.01); *G01N 2291/0231* (2013.01); *G01N 2291/02827* (2013.01); *G01N 2291/044* (2013.01); *G01N 2291/048* (2013.01)

(58) Field of Classification Search
CPC . B32B 3/08; B32B 2307/51; B32B 2260/046; B32B 2262/106; B32B 2419/00; B32B 2250/02; B32B 2250/44; B32B 2250/20; B32B 2605/18; B32B 2260/021; B32B 2605/16; G01N 29/11; G01N 29/041; G01N 29/07; G01N 2291/02827; G01N 2291/011; G01N 2291/0231; G01N 2291/048; G01N 2291/015; G01N 2291/044; B64F 5/60; B64C 2001/0072; Y02T 50/40; C08K 2003/265; C08K 2003/262; C08K 3/26; C08K 2003/267
USPC .......................................................... 73/573
See application file for complete search history.

(56) References Cited

U.S. PATENT DOCUMENTS

| | | |
|---|---|---|
| 2006/0020102 A1 | 1/2006 | Qureshi et al. |
| 2008/0050589 A1 | 2/2008 | Tsushima et al. |
| 2011/0107578 A1 | 5/2011 | Jörn |
| 2014/0107281 A1 | 4/2014 | Nishimura et al. |
| 2014/0353310 A1 | 12/2014 | Perkins et al. |
| 2015/0024160 A1* | 1/2015 | Georgeson ............... B64C 3/26 428/60 |
| 2015/0125686 A1 | 5/2015 | Rakutt et al. |
| 2015/0346358 A1 | 12/2015 | Arimoto et al. |
| 2015/0355062 A1* | 12/2015 | Housen .................... G01N 3/08 73/827 |
| 2016/0160092 A1 | 6/2016 | Awkal et al. |
| 2016/0176085 A1 | 6/2016 | Brok et al. |
| 2017/0066216 A1 | 3/2017 | Kosugi et al. |
| 2017/0210860 A1 | 7/2017 | Tonelli et al. |
| 2017/0218614 A1 | 8/2017 | Ciuperca |
| 2017/0321094 A1 | 11/2017 | Holtgrewe et al. |
| 2019/0127615 A1 | 5/2019 | Humfeld et al. |

* cited by examiner

ADHESIVE ADDITIVE WITH ENHANCED STIFFNESS CHANGE AND NON-DESTRUCTIVE INSPECTION METHOD

CROSS REFERENCE

The application is a Divisional Application claiming priority to U.S. Ser. No. 15/794,476, filed Oct. 26, 2017, and issued Jun. 9, 2020 as U.S. Pat. No. 10,677,759, the entire contents of which are incorporated by reference herein, as if made a part of this present application.

TECHNOLOGICAL FIELD

The present disclosure relates generally to non-destructive inspection methods for cured composite materials. More specifically, the present disclosure relates to non-destructive ultrasonic inspection methods for cured composite materials.

BACKGROUND

Composite materials have shown commercial utility as replacements for structural materials used to make structural components, especially as replacements for metals that typically have a greater material density and therefore weigh more than do lighter composite materials.

Composite materials are typically made by combining or "laying up" sequential layers, or laminates, of a fiber-containing material that is impregnated with a resin-material, followed by curing. Such impregnated fiber layers, or "prepregs" typically comprise a resin that serves, among other functions, to adhere the prepreg layers together upon curing, with such curing typically accomplished at temperatures and pressures that are greater than ambient temperatures and pressures.

In the field of aeronautics, airplanes and other spacecraft typically comprise structural components made from adhesively joined composite materials, although adhesively joined composite materials also can be used to make other vehicles and objects. Adhesive bonding layers between adhered composites, or between a composite and other material parts, especially post-cure, cannot be observed or inspected without destroying the bond, as well as the components made by parts by adhesively joined parts. Therefore, determining the strength of an adhesive bond in a component comprising adhesive bonds has required mechanically testing the bond invasively, resulting in the destruction of the part as mechanical stress-based bond testing is conducted.

In the aeronautical field, regulatory concern over the incomplete bonding of adhesively joined composite materials has led to regulations requiring the use and placement of mechanical fasteners at the location of adhesively joined composite parts. Installing such fasteners to satisfy regulatory mandates increases overall labor, production time and cost for the manufacturing methods of structures comprising joined composite materials, as well as increasing weight and cost of the resulting manufactured structure comprising the adhesively joined composite materials.

Practical, non-destructive inspection methods of adhesively joined composite materials have not been devised, or have not yet been accepted by regulatory authorities. Further, inspection methods of adhesively joined composite materials that are destructive (e.g., the adhesively joined composite parts must be destroyed to conduct inspection and determine satisfactory bonding of the adhesively joined composite parts) render the adhesively joined composites, or parts made from the adhesively joined composites, useless after inspection, and would therefore add to composite material waste. Such composite material waste leads to increased cost, and also leads to increases in production time, and/or production delays that can further result in cost increases.

SUMMARY

An aspect of the present disclosure is directed to non-destructive inspection methods for inspecting the joint of adhesively joined composite parts, the method comprising applying ultrasonic testing to at least two adhesively joined composite materials that are joined together via the adhesive, with the adhesive comprising a reaction product stiffening agent.

Another aspect of the present disclosure is directed to an uncured phenolic resin adhesive for joining composite materials, with the uncured phenolic resin adhesive comprising a curable phenolic resin adhesive and an amount of a stiffening agent precursor.

In another aspect, the stiffening agent precursor includes at least one of calcium ions, barium ions; magnesium ions, sodium ions, or potassium ions.

In a further aspect, the curable phenolic resin adhesive comprises a stiffening agent precursor in an amount ranging from about 0.1 wt % to about 5.0 wt %.

Another aspect of the present disclosure is directed to a component comprising a first composite part joined to a second composite part, wherein the first composite part and the second composite part comprise a carbon fiber-reinforced plastic, with a bonding layer interposed between the first composite part and the second composite part, with the bonding layer formed by curing a phenolic resin adhesive, and with the bonding layer comprising a reaction product stiffening agent.

In another aspect the reaction product stiffening agent comprises calcium carbonate.

In another aspect, the bonding layer comprises a Young's modulus value ranging from about 40 GPa to about 100 GPa, and the first composite part and the second composite part each comprising Young's modulus value ranging from about 2 GPa to about 20 GPa.

Another aspect of the present disclosure is directed to a method for inspecting a bond formed between adhesively-joined composite parts, with the method comprising applying ultrasonic waves to a composite component, with the composite component comprising at least a first composite part adhesively-joined to a second composite part to form a bonding layer interposed between the first composite part and the second composite part, with the bonding layer comprising a cured phenolic resin adhesive, with the first composite part and said second composite part comprising a first Young's modulus value and the bonding layer comprising a reaction product stiffening agent, with the reaction product stiffening agent comprising a second Young's modulus value. The first Young's modulus value and the second Young's modulus value are non-destructively measured.

According to another aspect, the first Young's modulus value and the second Young's modulus value are non-destructively measured.

In another aspect, a difference exits between the first and second Young's modulus values, with the difference between the first Young's modulus value and the second Young's modulus value ranging from about 20 GPa to about 80 GPa.

According to another aspect, in the step of measuring the first Young's modulus value and the second Young's modulus value, the first Young's modulus value ranges from about 2 GPa to about 20 GPa and the second Young's modulus value ranges from about 40 GPa to about 100 GPa.

A further aspect of the present disclosure is directed to a method for adhesively joining composite parts, the method comprising applying a phenolic resin adhesive to at least a portion of a surface of a first composite part surface or applying a phenolic resin adhesive to at least a portion of a surface of a second composite part, with the phenolic resin adhesive comprising an amount of stiffening agent precursor and interposing the phenolic resin adhesive between the first composite part and the second composite part and curing the phenolic resin adhesive to form a bonding layer, wherein the bonding layer comprises an amount of a reaction product stiffening agent.

In another aspect, in the step of curing the phenolic adhesive to form a bonding layer, the bonding layer comprises a Young's modulus value ranging from about 40 GPa to about 100 GPa, and the first composite part and second composite part each comprise a Young's modulus value ranging from about 2 GPa to about 20 GPa The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
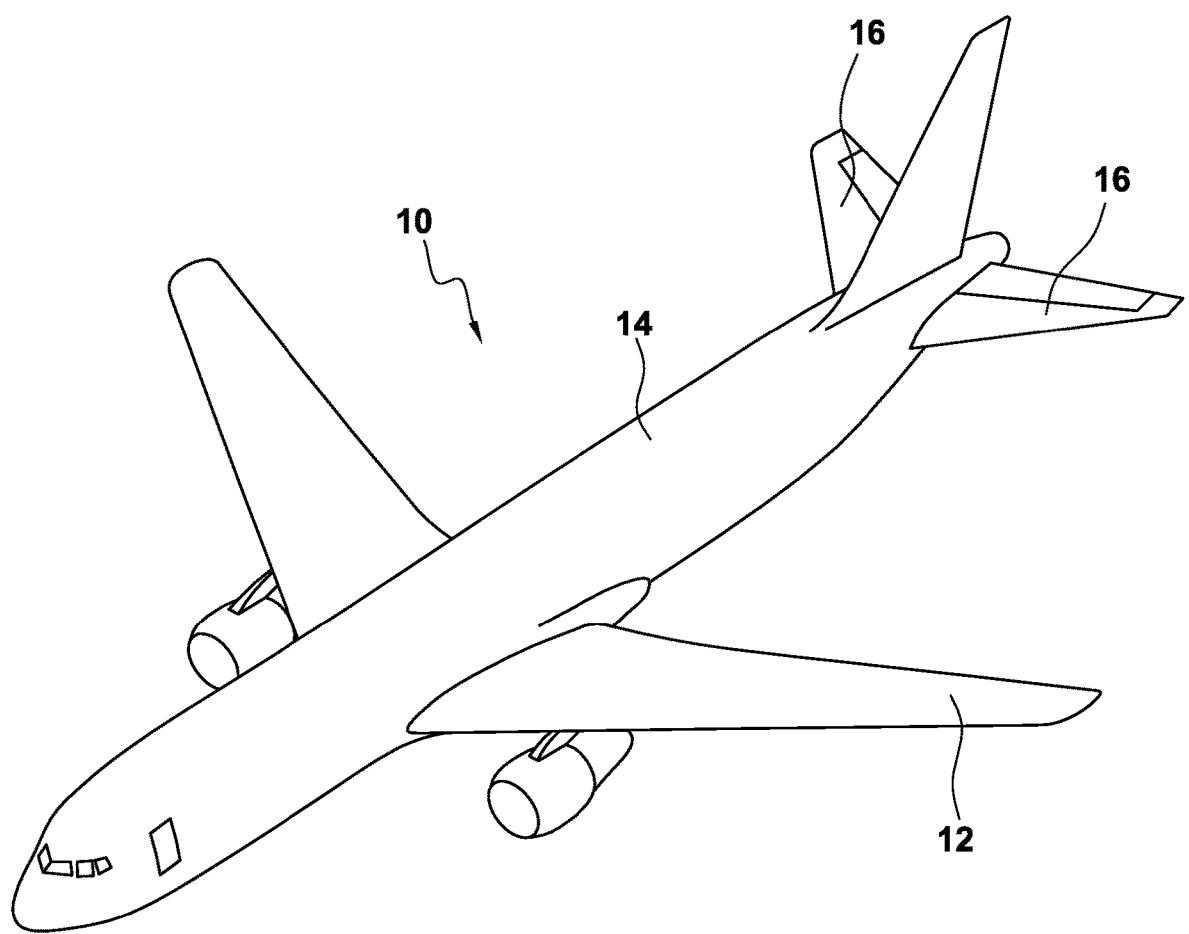

Having thus described variations of the disclosure in general terms, reference will now be made to the accompanying drawings, which are not necessarily drawn to scale, and wherein:

FIG. 1 is an illustration of a vehicle comprising a component comprising composite parts made according to aspects of the present disclosure.

Figure 2:
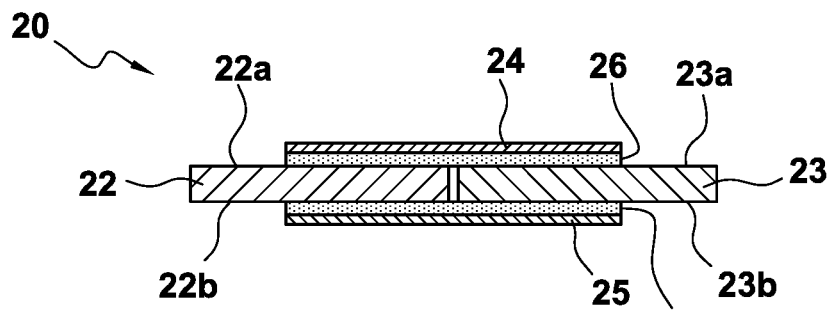

FIG. 2 is a cross-sectional perspective view of a component comprising composite parts joined according to aspects of the present disclosure.

Figure 3:
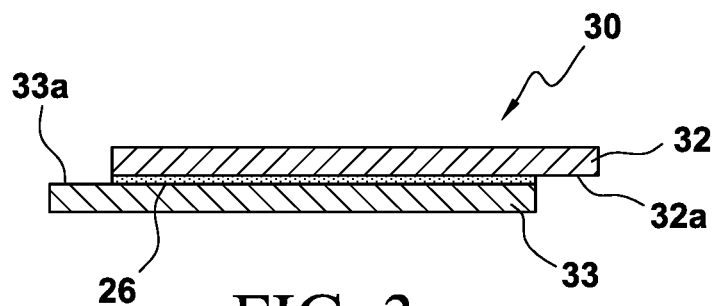

FIG. 3 is a cross-sectional perspective view of a component comprising composite parts joined according to aspects of the present disclosure.

Figure 4:
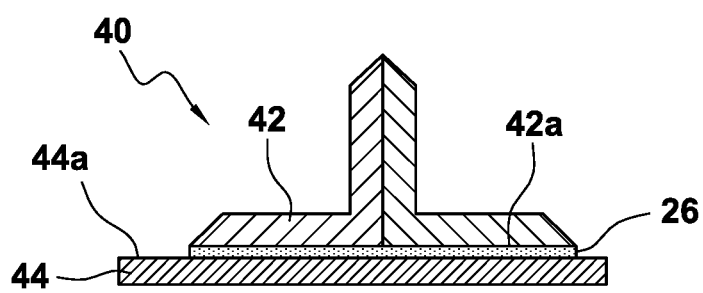

FIG. 4 is a cross-sectional perspective view of a component comprising composite parts joined according to aspects of the present disclosure.

Figure 5:
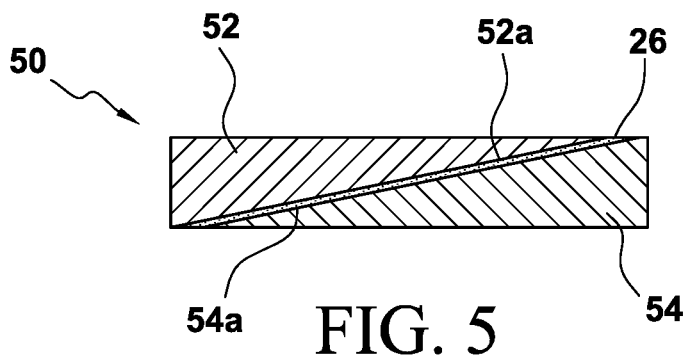

FIG. 5 is a cross-sectional perspective view of a component comprising composite parts joined according to aspects of the present disclosure.

Figure 6:
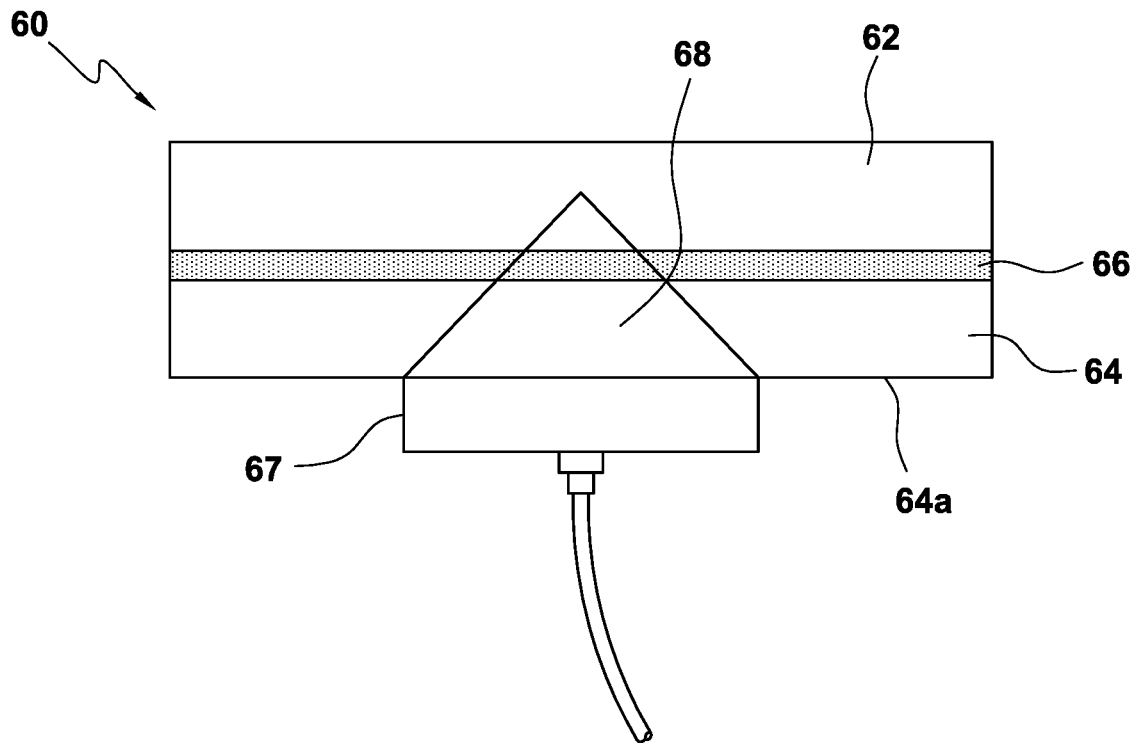

FIG. 6 is a cross-sectional perspective view of a component comprising composite parts joined according to aspects of the present disclosure with an ultrasound probe in position to conduct a non-destructive ultrasound inspection.

Figure 7:
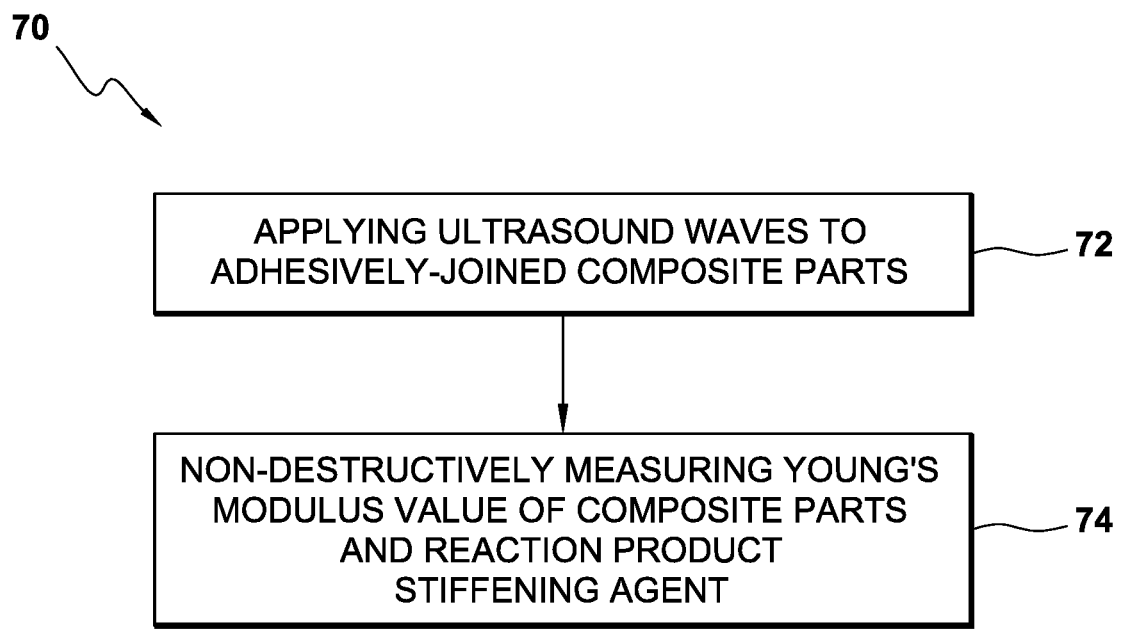

FIG. 7 is a flow chart outlining a method according to aspects of the present disclosure.

Figure 8:
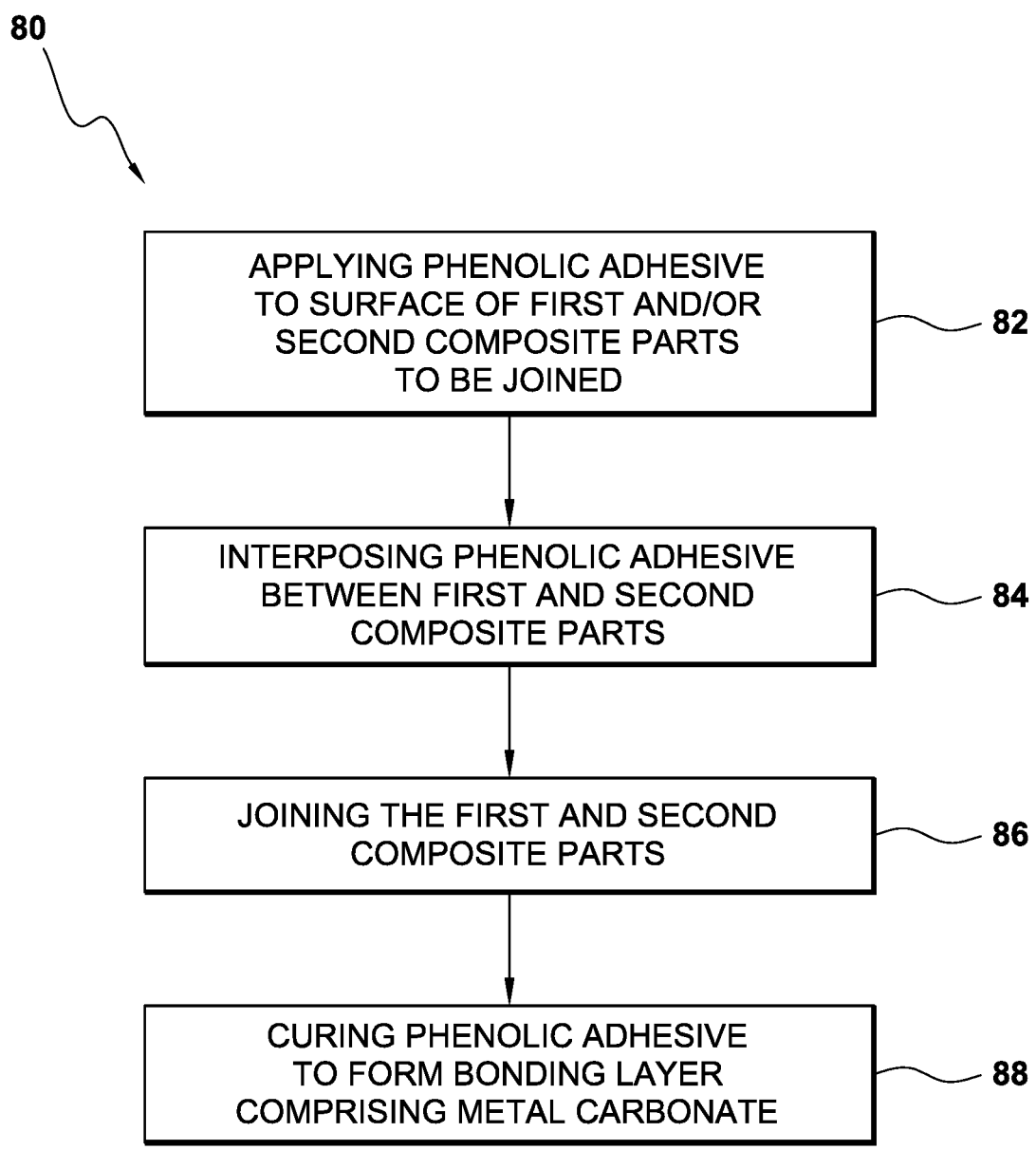

FIG. 8 is a flow chart outlining a method according to further aspects of the present disclosure.

Figure 9:
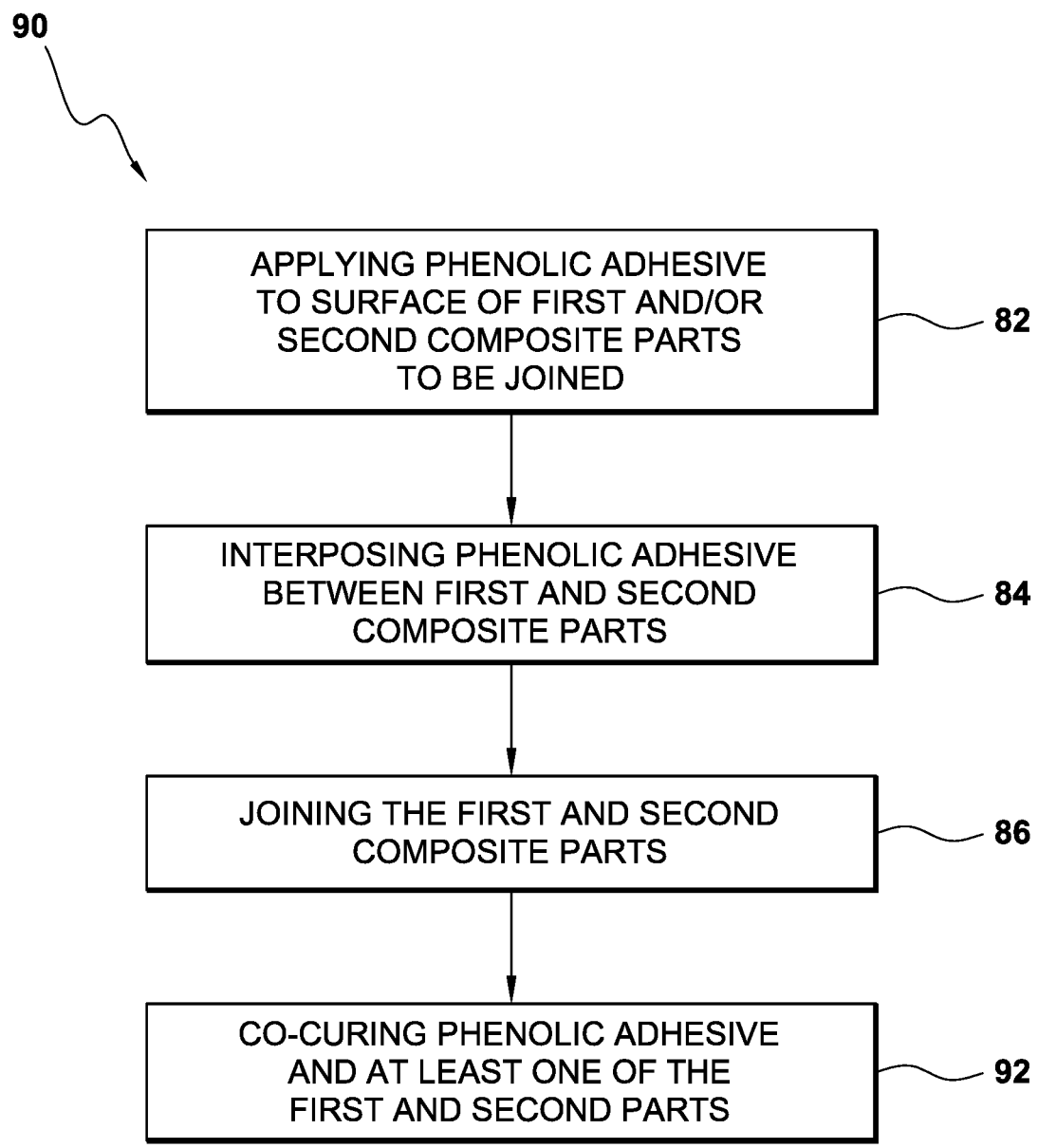

FIG. 9 is a flow chart outlining a method according to further aspects of the present disclosure.

DETAILED DESCRIPTION

Aspects of the present disclosure are directed to components made from composite parts joined together with a phenolic resin adhesive, with the phenolic resin adhesive comprising amounts of a stiffening agent precursor. The stiffening agent precursor reacts, during phenolic resin adhesive curing, with compounds in the phenolic resin adhesive and/or compounds present in the composite material used to form the composite parts, to form a reaction product stiffening agent in the bonding layer that is formed between the composite parts by the curing the phenolic resin adhesive.

Furthermore, by including a reactive stiffening agent precursor in the phenolic resin adhesive, as the phenolic resin adhesive becomes cured to form a bonding layer between composite parts to be joined, the bonding layer comprises a reaction product stiffening agent that can be detected non-destructively by applying ultrasonic waves to the joined composite material parts. Ultrasonic waves can then be non-destructively applied to the joined composite material parts. That is, the ultrasonic waves are applied to the joined composite material parts, and the bonding layer that is interposed between the composite material parts can be inspected or otherwise evaluated ultrasonically without disassembling the composite material parts or otherwise destroying or invading the joined composite material parts (e.g., bisecting the joined composite material parts to expose a cross-section, that would otherwise be required to inspect or otherwise evaluate the bonding layer, etc.).

According to aspects of the present disclosure, composite parts are adhesively joined together by applying a phenolic resin adhesive. According to further aspects, the phenolic resin adhesive further comprises a stiffening agent precursor. The stiffening agent precursor is provided to the adhesive compound in an amount stoichiometrically adequate to react with compounds (e.g., by-products) produced by the phenolic resin during phenolic resin adhesive curing, as well as compounds present in the composite material. During curing of the phenolic resin adhesive, the cured phenolic resin adhesive forms a bonding layer between the composite parts, and the stiffening agent precursor is converted from a stiffening agent precursor to a reaction product stiffening agent, equivalently referred to herein as a "stiffening agent". The contemplated stiffening agents are compounds that will substantially remain in the bonding layer for the useful life of composite components made from the adhesively-joined composite parts. As explained in greater detail herein, the contemplated reaction product stiffening agents are metal carbonates, and, more particularly include calcium carbonate, barium carbonate, magnesium carbonate, sodium carbonate and potassium carbonate.

Phenolic resin adhesives, such as those contemplated by aspects of the present disclosure, comprise phenolic compounds formed through the condensation of phenol and formaldehyde, generating amounts of water as a reaction byproduct. For the purpose of the present disclosure, the terms "phenolic resins", "phenolic adhesives", "phenolic resin adhesives" and "phenol formaldehyde resins" are equivalent terms used interchangeably, so long as the selected phenolic resin adhesive releases an amount of water as a by-product of the curing reaction. Presently contemplated phenolic resin adhesives include, without limitation, novolacs and resoles.

Novolacs are phenol formaldehyde resins also contemplated for use according to the present disclosure. Novolacs are understood to be phenolic resin prepolymer compounds obtained by reacting phenol and formaldehyde directly to produce a moldable compound that is then cured with a further formaldehyde addition and heat. Novolacs comprise a formaldehyde-to-phenol molar ratio of less than one, with phenol units predominantly linked by methylene and/or ether groups.

Resoles are base-catalyzed phenol formaldehyde resins made with a formaldehyde-to-phenol molar ratio of greater than one, and are characterized as thermoset materials referred to as "one-step" resins that cure without a cross-linker (e.g. unlike novolacs that are considered to be "two-step" resins).

Phenolic resin adhesives can be applied, for example, in film form at various thicknesses (e.g. film thicknesses ranging from about 5 to about 12 mils) and weights ranging from about 0.023 to 0.075 lb/ft$^2$, and can be cured at about 250° F. to bond various substrates, including, for example, CFRP, aluminum, etc. Phenolic resin adhesives contemplated according to aspects of the present disclosure include, without limitation, novolacs, resoles and specific commercially available phenolic resins adhesives, including AF-30 (3M); AF-32 (3M); L-310FR (J. D. Lincoln); etc.

The term "ultrasonic testing" encompasses a family of non-destructive testing techniques applying ultrasonic waves to a material or object being tested. For the purpose of the present disclosure, the terms "ultrasonic testing" and "ultrasound testing" are equivalent terms used interchangeably. Typical high frequency ultrasonic testing, according to aspects of the present disclosure, uses short ultrasonic pulse waves with frequencies ranging from about 0.1 to about 15 MHz, and up to 50 MHz. Depending on the thickness of substrates being evaluated, low frequency ultrasound wave ranging from about 500 Hz to about 1000 Hz are also contemplated according to aspects of the present disclosure. Pulse waves are transmitted non-destructively from an ultrasound source (e.g. an ultrasound transducer or probe) into materials, for example, including to a predetermined and controllable distance or depth internally from an exposed material surface. Aspects of the present disclosure contemplate using ultrasound techniques, including both reflection mode or attenuation mode to detect elasticity modulus values, otherwise known as Young's modulus values, for tested samples. Commercially available software for use in ultrasonic diagnostic systems include for example, and without limitation NDT Tom-View Software (NDT Instruments); OmniScan MX2 (Olympus Corp.), etc. Ultrasound transducers suitable for use according to aspects of the present disclosure include, without limitation, Y-angle transducers such as ST1 Series Transducers, ST1-45L-1HC; ST1-L70, STZ1-60L-1HC (Olympus Corp.).

Young's modulus, also known as elastic modulus, is the measure of the "stiffness" of a solid material, and is the mechanical property of the linear elasticity defining the relationship between stress and strain in a material. Several techniques are used to measure Young's modulus. One technique uses the ultrasonic propagating velocity of longitudinal and transverse waves which are fixed. This is accomplished by using the digital correlation technique between the ultrasonic original signal and the echo signal from a surface. Via this technique, one can measure the elastic constants of the material under inspection. Such a technique typically uses a high frequency ultrasound ranging from about 30 MHz to about 60 MHz.

Composite materials, such as carbon fiber-reinforced plastics (CFRPs) have a Young's modulus ranging from about 2 GPa to about 20 GPa. When a CFRP part is adhesively bonded to another CFRP part using a thin adhesive layer, including thin layers of phenolic resin adhesives, the variance of the Young's modulus between the CFRP material and the thin bonding layer does not produce a significant enough degree of variance to be a reliable indicator of adequate bonding of the CFRP parts. Indeed, the Young's modulus of phenolic formaldehyde adhesive is about 11 GPa; a value that is deemed to be too close to the Young's modulus value for structural CFRP resin (e.g., about 2.8 GPa) and carbon fiber transverse modulus (e.g., about 17 GPa).

However, according to aspects of the present disclosure, stiffening agent precursors are introduced into the phenolic resin adhesive such that, upon phenolic resin adhesive curing, the stiffening agent precursor reacts with phenolic resin adhesive reaction products, including water, and also compounds or ions present in the neighboring composite part material (e.g., carbon ions in the CFRP) to produce a desired stiffening agent that is retained in the cured phenolic resin adhesive bonding layer that results between the CFRP parts.

When the stiffening agent (that has a Young's modulus that is significantly different from the Young's modulus of the CFRP surrounding the bonding layer) is produced in the phenolic resin adhesive bonding layer, ultrasound techniques are employed to detect the presence of such stiffening agents. Contemplated stiffening agents produced as reaction products of metal ions, water and carbon will produce predetermined amounts of carbonates having a detectable Young's modulus value that is significantly different from the CFRP parts. For example, when calcium ions are introduced into the phenolic resin adhesive, upon curing of the phenolic resin adhesive, the calcium ions react with water and carbon ions present in the CFRPs to form calcium carbonate as the stiffening agent, with the calcium carbonate having a Young's modulus value of about 70 GPa, Stiffening agent precursors (e.g., metal ions, including calcium ions, barium ions, magnesium ions, sodium ions, and potassium ions) are added to the phenolic resin adhesive in an amount ranging from about 0.1 wt. % to about 5 wt. % to react with the phenolic resin adhesive reaction by-products during phenolic resin adhesive curing to form the ultrasonically detectable metal carbonate stiffening agents.

Metal carbonates contemplated as useful stiffening agents, according to aspects of the present disclosure are the metal carbonates having a Young's modulus value ranging from about 40 GPa to about 100 GPa; a value significantly higher than: 1) the Young's modulus value of the CFRPs known to range from about 2 to about 20 GPa, and preferably from about 2 to about 3 GPa, and 2) phenolic resin adhesives that do not contain reaction product stiffening agents known to have GPa values of about 11 GPa. Such metal carbonates include barium carbonate, magnesium carbonate, sodium carbonate and potassium carbonate.

FIG. 1 is an illustration of an aircraft comprising joints made according to aspects of the present disclosure. As shown in FIG. 1, aircraft 10 comprises structural assemblies not visible from the aircraft's exterior comprising joints in various assemblies throughout the aircraft's wings 12 fuselage 14, stabilizer 16, etc. In addition, aspects of the present disclosure further contemplate components having joints comprising composite materials bonded together using the phenolic resin adhesives described herein. Accordingly, aspects of the present disclosure contemplate objects comprising the presently disclosed joints, including, without limitation, stationary objects such as, for example, buildings, etc., and vehicles including terrestrial and marine vehicles as well as aircraft, and as described further herein.

FIGS. 2, 3, 4, 5 and 6 are cross-sectional perspective views of various component parts comprising joined surfaces or joints where composite parts are joined by applying an interposed phenolic resin adhesive. FIG. 2 shows a cross-sectional perspective view of a double strap joint 20 of the type that can, for example, be used in various bonded assemblies throughout an aircraft. As shown in FIG. 2, first composite part 22 and second composite part 23 are joined by placing a first brace 24 on top of composite parts 22 and 23; and a second brace 25 placed beneath composite parts 22 and 23. An amount of phenolic resin adhesive is shown interposed and cured to form a bonding layer 26 between the first brace 24 and the first composite part upper surface 22a and the second composite part upper surface 23a. A further amount of phenolic resin adhesive 26 is also shown interposed between the second brace 25 and the first composite part lower surface 22b and the second composite part lower surface 23b. According to aspects of the present disclosure, the first and second composite parts 22 and 23 comprise a CFRP material.

FIG. 3 shows a cross-sectional perspective view of a single lap joint 30 that can, for example, be used in a bonded assembly of an aircraft. As shown in FIG. 3, a first composite part 32 is joined to a second composite part 33 by interposing and curing a phenolic resin adhesive to form a bonding layer 26. As shown in FIG. 3, bonding layer 26 is interposed between the first composite part lower surface 32a and the second composite upper surface 33a. According to aspects of the present disclosure, the first and second composite parts 32 and 33 comprise a CFRP material FIG. 4 shows a cross-sectional perspective view of a stringer bond joint 40 of the type that can, for example, be used in various bonded assemblies throughout an aircraft. As shown in FIG. 4, a first composite part 42 is joined to a second composite part 44 by interposing and curing an amount of phenolic resin adhesive to form a bonding layer 26. The bonding layer 26 is interposed between the first composite part lower surface 42a and the second composite part upper surface 44a. According to aspects of the present disclosure, the first and second composite parts 42 and 44 comprise a CFRP material.

FIG. 5 shows a cross-sectional perspective view of a scarf joint 50 of the type that can, for example, be used in various bonded assemblies throughout an aircraft. As shown in FIG. 5, a first composite part 52 and second composite part 54 are joined together by interposing and curing an amount of a phenolic resin adhesive to form a bonding layer 26. Bonding layer 26 is interposed between the first composite part lower surface 52a and the second composite part upper surface 54a. According to aspects of the present disclosure, the first and second composite parts 52 and 54 comprise a CFRP material.

FIG. 6 shows an enlarged cross-sectional perspective view of a representative joint 60 formed according to aspects of the present disclosure that can, for example, be used in various bonded assemblies throughout a structure such as, for example, a vehicle including, without limitation, an aircraft. As shown in FIG. 6, a joint 60 is formed by adhering a first composite part 62 to a second composite part 64 by interposing and curing the interposed phenolic resin adhesive to form a bonding layer 66. FIG. 6 also shows an ultrasound probe 67 in contact with the second composite part outer surface 64a. The extent to which ultrasonic energy is delivered to internal structure of joint 60 is shown by triangular beam 68. According to aspects of the present disclosure, the first and second composite parts 62 and 64 comprise a CFRP material.

FIG. 7 is a flowchart outlining a method 70 according to an aspect of the present disclosure comprising applying 72 ultrasonic waves to adhesively joined composite parts, and non-destructively measuring 74 the Young's modulus values of the composite parts and the Young's modulus value of a reaction product stiffening agent present in the bonding layer interposed between the composite parts for the purpose of adhering two composite parts. The contemplated composite parts are preferably made from composite materials (e.g., carbon fiber-reinforced plastics), and the adhesive that is interposed between the composite parts to adhere the composite parts is a phenolic resin adhesive that is cured to form a bonding layer between the adhesively joined composite parts.

FIG. 8 is a flowchart outlining a method 80 further detailing the method of FIG. 7. As shown in FIG. 8, a method 80 is disclosed for adhesively joining composite parts by applying 82 a phenolic resin adhesive to at least a portion of a surface of a first composite part surface or at least a portion of a surface of a second composite part with the phenolic resin adhesive comprising an amount of metal ions. The method contemplates interposing 84 the phenolic resin adhesive between the first composite part and the second composite part followed by joining 86 the first and second composite parts and curing 88 the phenolic resin adhesive to form a bonding layer interposed between the first and second composite, with the bonding layer comprising a metal carbonate.

FIG. 9 is a flowchart outlining a further method 90, as a modification and alternative to the method outlined in FIG. 7, wherein steps 82, 84 and 86 as shown in FIG. 8 are conducted, followed by co-curing 92 at least one of the first and/or second composite parts with the phenolic resin adhesive.

According to aspects of the present disclosure, by incorporating at least one type of stiffening agent precursor into a phenolic resin adhesive (e.g., an uncured phenolic resin adhesive system), the integrity and strength of the bond formed between two composite parts to be joined by the phenolic resin adhesive, after curing the phenolic resin adhesive, can be identified and quantified by non-destructive and non-invasive ultrasound imaging. The stiffening agent precursors (e.g. the metal ions) react with compounds (e.g., carbon) from the composite parts to be joined (e.g., CFRPs) and reaction by-products in the phenolic resin adhesive (e.g., water) to form reaction product stiffening agents (e.g. metal carbonates) that are retained in the cured phenolic resin adhesive bonding layer. Such reaction product stiffening agents are detectable by ultrasound analysis. The detection by ultrasound of such reaction product stiffening agents in the bonding layer, in the form of metal carbonates, provides conclusive proof of the completed curing reaction and desired and requisite adhesion of the composite parts to one another. Aspects of the present disclosure therefore provide useful and highly effective non-destructive inspection methods, especially for joints, as the reaction product stiffening agents reflect ultrasound pressure waves to generate a detectable and stronger return signal (e.g., two to four times stronger) than the return signal detected for the composite material, and/or a cured phenolic resin adhesive that does not contain reaction product stiffening agents.

According to further aspects of the present disclosure, a phenolic resin adhesive is prepared by incorporating an amount of stiffening agent precursors into the phenolic resin adhesive. Contemplated stiffening agent precursors include metal ions, with preferred stiffening agent precursors including at least one of calcium ions, barium ions, magnesium ions, sodium ions or potassium ions, with calcium ions being particularly preferred. While not being bound to any particular theory, the metal ions incorporated into the phenolic resin adhesive react with water that is precipitated from the phenolic resin during phenolic resin adhesive curing (e.g., heating to about 250° F. for 60 mins). Carbon from the composite parts that are proximate to the phenolic adhesive (e.g., the CFRP parts being adhered together) reacts with the water and the metal ions to form an amount of metal carbonate in the cured bonding layer (e.g., the bonding layer interposed between the composite material (e.g., CFRP) parts that results from curing the phenolic resin adhesive).

According to aspects of the present disclosure, the metal ions, including calcium, barium, magnesium, sodium, and potassium that react with carbon and water to form corresponding carbonates in the bonding layer produce amounts of stable metal carbonate in the bonding layer that can be detected using ultrasound technology. When calcium carbonate is produced as the metal carbonate stiffening agent, the calcium carbonate is detected via ultrasound testing in the bonding layer due to the significant difference of the Young's modulus value of calcium carbonate (e.g., about 70 GPa) as compared to the Young's modulus of the surrounding composite (e.g., CRFP) parts bound to one another by the cured phenolic resin adhesive in the bonding layer. This inclusion of metal ions, particularly calcium ions, into a phenolic resin adhesive as a stiffening agent precursor yields calcium carbonate as a reaction product stiffening agent in the cured phenolic resin adhesive (e.g. the bonding layer) that has now been shown to be detectable when applying ultrasound to the CFRP parts joined together by cured phenolic resin adhesives comprising such stiffening agent precursors.

Example 1

Preparing the Phenolic Resin Adhesive with Calcium Ions in Uncured Resin

Calcium is incorporated into a phenolic resin adhesive, such as Durex™ Resin SC-1008 resole phenolic resin (Hexion), Durex™ 32241 (Sbhpp) novolac phenolic resin, etc. In this Example, calcium serves as the stiffening agent precursor. Calcium hydroxide is obtained in granular form (Sigma Aldrich) and pulverized/ground to a fine powder in an inert atmosphere of nitrogen in a ball mill. The fine powder is dispersed into the phenolic resin adhesive resin and held substantially in suspension using turbid mixing/agitation techniques at ambient temperature and pressure. Calcium hydroxide is added to the phenolic resin adhesive in a bulk concentration ranging from about 0.1 wt. % to about 5.0 wt. % leaving calcium trace concentrations ranging from about 0.001 wt. % to about 0.1 wt. %.

Example 2

Preparing the Phenolic Resin Adhesive with Barium Ions in the Uncured Resin

An amount of barium is incorporated into a phenolic resin adhesive such as Durex™ Resin SC-1008 resole phenolic resin (Hexion), Durex™ 32241 (Sbhpp) novolac phenolic resin, etc. In this Example, barium serves as the stiffening agent precursor. Barium hydroxide is obtained in granular form (Sigma Aldrich) and is pulverized/ground to a fine powder in an inert atmosphere of nitrogen in a ball mill. The fine powder is dispersed into the phenolic resin adhesive resin and held substantially in suspension using turbid mixing/agitation techniques at ambient temperature and pressure. Barium hydroxide is added to the phenolic resin adhesive in a bulk concentration ranging from about 0.1 wt. % to about 5.0 wt. % leaving barium trace concentrations ranging from about 0.001 wt. % to about 0.1 wt. %.

Example 3

Preparing the Phenolic Resin Adhesive with Magnesium Ions in the Uncured Resin

An amounts of magnesium is incorporated into a phenolic resin adhesive such as Durex™ Resin SC-1008 resole phenolic resin (Hexion), Durex™ 32241 (Sbhpp) novolac phenolic resin, etc. In this Example, barium serves as the stiffening agent precursor. Magnesium hydroxide is obtained in granular form (Sigma Aldrich) and is pulverized/ground to a fine powder in an inert atmosphere of nitrogen in a ball mill. The fine powder is dispersed into the phenolic resin adhesive resin and held substantially in suspension using turbid mixing/agitation techniques at ambient temperature and pressure. Magnesium hydroxide is added to the phenolic resin adhesive in a bulk concentration ranging from about 0.1 wt. % to about 5.0 wt. % leaving barium trace concentrations ranging from about 0.001 wt. % to about 0.1 wt. %.

Example 4

Preparing the Phenolic Resin Adhesive with Sodium Ions in the Uncured Resin

An amounts of sodium is incorporated into a phenolic resin adhesive such as Durex™ Resin SC-1008 resole phenolic resin (Hexion), Durex™ 32241 (Sbhpp) novolac phenolic resin, etc. In this Example, barium serves as the stiffening agent precursor. Sodium hydroxide was obtained in granular form (Sigma Aldrich) and is pulverized/ground to a fine powder in an inert atmosphere of nitrogen in a ball mill. The fine powder is dispersed into the phenolic resin adhesive resin and held substantially in suspension using turbid mixing/agitation techniques at ambient temperature and pressure. Sodium hydroxide is added to the phenolic resin adhesive in a bulk concentration ranging from about 0.1 wt. % to about 5.0 wt. % leaving barium trace concentrations ranging from about 0.001 wt. % to about 0.1 wt. %.

Example 5

Preparing the Phenolic Resin Adhesive with Potassium Ions in the Uncured Resin

An amounts of barium is incorporated into a phenolic resin adhesive such as Durex™ Resin SC-1008 resole phenolic resin (Hexion), Durex™ 32241 (Sbhpp) novolac phenolic resin, etc. In this Example, barium serves as the stiffening agent precursor. Potassium hydroxide was obtained in granular form (Sigma Aldrich) and is pulverized/ground to a fine powder in an inert atmosphere of nitrogen in a ball mill. The fine powder is dispersed into the phenolic resin adhesive resin and held substantially in suspension using turbid mixing/agitation techniques at ambient temperature and pressure. Potassium hydroxide is added to the phenolic resin adhesive in a bulk concentration ranging from about 0.1 wt. % to about 5.0 wt. % leaving barium trace concentrations ranging from about 0.001 wt. % to about 0.1 wt. %.

Example 6

Applying the Phenolic Resin Adhesive

The phenolic resin adhesive obtained in Examples 1, 2, 3, 4, or 5 is applied as a film placed onto a sample of a first CFRP composite material part, or is applied onto the CFRP composite material part as a paste with an application tool. A second CFRP composite material part is brought into contact with the first CFRP composite part such that the phenolic adhesive is interposed between the two CFRP parts. The CFRP/Phenolic resin adhesive/CFRP part assembly is then cured by heating to 250° F. at a pressure of 20 psi in a press. While Example 6 is directed to two composite parts joined with one interposed layer of phenolic resin adhesive comprising metal ions as stiffening agent precursors (e.g., forming a component comprising a single "sandwich" arrangement), aspects of the present disclosure further contemplate joining composite parts comprising multiple layers, wherein more than two composite parts are joined by interposing layers of phenolic resin adhesive comprising metal ions as stiffening agent precursors (e.g., forming a component comprising multiple or "stacked sandwich" arrangement) by repeating the processes outlined in and of Examples 1-5, and Example 6.

Aspects of the present disclosure are directed to methods for introducing a stiffening agent precursor into a phenolic resin adhesive for the purpose of producing a stiffening agent in the cured phenolic resin adhesive, as well as the adhesives themselves, inspection methods of parts using the disclosed phenolic resin adhesives as well the parts joined by the phenolic resin adhesives presented herein. According to one contemplated process, disclosed phenolic resin adhesives comprising the stiffening agent precursor are applied to and are otherwise interposed between two cured CFRP parts, with the phenolic resin adhesive then cured to effect the reaction within the phenolic resin adhesive (containing the stiffening agent precursor) to produce to produce detectable amounts of a reaction product stiffening agent within the cured phenolic resin adhesive bonding layer. This process is referred to herein as "secondary bonding".

According to another contemplated process, disclosed phenolic resin adhesives comprising the stiffening agent precursor are applied to and are otherwise interposed between two uncured CFRP parts with both of the uncured CFRP parts and the phenolic resin adhesive cured during one curing protocol, and referred to herein as "co-curing".

According to a further contemplated process, disclosed phenolic resin adhesives comprising the stiffening agent precursor are applied to and are otherwise interposed between one cured CFRP part and one uncured CFRP parts, with both the uncured CFRP part and the phenolic resin adhesive cured during one curing protocol, and referred to herein as "co-bonding".

According to aspects of the present disclosure, and as illustrated in the Examples, the phenolic resin adhesives comprising the stiffening agent precursor (e.g., the metal ions) can be applied to already cured composite materials, with the phenolic resin adhesive then being cured to form the bonding layer that then comprises the stiffening agent (e.g., the metal carbonate). According to other aspects, the phenolic resin adhesive, can be applied to composite parts, where one or both of the composite parts are in an uncured state, as well as being applied to composite parts where one or both of the composite parts are co-cured with the phenolic resin adhesive.

The present disclosure therefore further contemplates the use of the disclosed adhesives, and/or composite parts in the manufacture of objects, including stationary structures including, without limitation buildings, supports, etc. The disclosed composite parts and methods of their manufacture are further contemplated for use in the manufacture of vehicles, including manned and unmanned aircraft, manned and unmanned spacecraft, manned and unmanned rotorcraft, manned and unmanned terrestrial vehicles, manned and unmanned surface water borne vehicles, manned and unmanned sub-surface water borne vehicles, and satellites, etc.

Aspects of the present disclosure can, of course, be carried out in other ways than those specifically set forth herein without departing from essential characteristics of aspects disclosed herein. The presently disclosed aspects are to be considered in all respects as illustrative and not restrictive, and all changes coming within the meaning and equivalency range of the appended claims are intended to be embraced therein.

What is claimed is:

1. A method for inspecting a bond formed between adhesively-joined composite parts, the method comprising:
    applying ultrasound waves from an ultrasound wave source to a cured composite component, said cured composite component comprising at least a first composite part adhesively joined to a second composite part and having a cured bonding layer interposed between the first composite part and the second composite part, said cured bonding layer comprising a cured phenolic resin adhesive, said first composite part comprising a first Young's modulus value and said second composite part comprising the first Young's modulus value and said cured bonding layer comprising a reaction product stiffening agent, said reaction product stiffening agent comprising an amount of a metal carbonate, said reaction product stiffening agent comprising a second Young's modulus value; and
    measuring a difference between the first Young's modulus value and the second Young's modulus value.

2. The method of claim 1, wherein, in the step of measuring the first Young's modulus value and the second Young's modulus value, the difference between the first Young's modulus value and the second Young's modulus value ranges from about 20 GPa to about 80 Pa.

3. The method of claim 1, wherein, in the step of measuring the first Young's modulus value and the second Young's modulus value, the first Young's modulus value ranging from about 2 GPa to about 20 GPa and the second Young's modulus value ranging from about 40 GPa to about 100 GPa.

4. The method of claim 1, wherein, the step of measuring the first Young's modulus value and the second Young's modulus value, further comprises conducting the measuring non-destructively.

5. The method of claim 1, wherein the reaction product stiffening agent comprises calcium carbonate.

6. The method of claim 1, wherein the metal carbonate comprises at least one of: calcium carbonate; barium carbonate; magnesium carbonate; sodium carbonate; and potassium carbonate.

7. The method of claim 1, wherein the step of applying ultrasound waves from an ultrasound wave source to a component further comprises:
    emitting ultrasound waves from an ultrasonic wave source at a frequency ranging from about 0.1 MHz to about 50 MHz.

8. The method of claim 1, wherein the step of applying ultrasound waves from an ultrasound wave source to a component further comprises:
    emitting ultrasound waves from an ultrasonic wave source at a frequency ranging from about 500 Hz to about 1000 Hz.

9. The method of claim 1, wherein at least one of the first composite part and the second composite part comprises an amount of carbon fiber-reinforced plastic material.

10. The method of claim 1, wherein phenolic resin adhesive is co-cured with at least one of the first composite part and the second composite part.

11. The method of claim 1, wherein phenolic resin adhesive is co-bonded with at least one of the first composite part and the second composite part.

12. The method of claim 1, wherein the reaction product stiffening agent is ultrasonically detectable.

13. A cured composite component comprising the cured bonding layer, said cured bonding layer inspected according to the method of claim 1.

14. A vehicle comprising the cured bonding layer inspected according to the method of claim 1.

15. The method of claim 1, wherein the difference between the first Young's modulus value and the second Young's modulus value is detected non-destructively.

16. The method of claim 1, wherein the ultrasound wave source detects the first Young's modulus value and the second Young's modulus value in a reflection mode.

17. The method of claim 1, wherein the ultrasound wave source detects the first Young's modulus value and the second Young's modulus value in an attenuation mode.

18. The cured composite component of claim 13, wherein the cured composite component comprises at least one of a double strap joint; a single lap joint; a stringer bond joint; a scarf joint; and combinations thereof.

19. Adhesively joined composite parts comprising the cured composite component of claim 18.

20. The vehicle of claim 14, wherein the vehicle comprises at least one of a manned aircraft, an unmanned aircraft, a manned spacecraft, an unmanned spacecraft, a manned rotorcraft, an unmanned rotorcraft, a manned terrestrial vehicle, an unmanned terrestrial vehicle, a manned surface water borne vehicle, an unmanned surface water borne vehicle, a manned sub-surface water borne vehicle, an unmanned sub-surface water borne vehicle, and a satellite.

* * * * *